us009185236B2

(12) United States Patent
Kim et al.

(10) Patent No.: US 9,185,236 B2
(45) Date of Patent: Nov. 10, 2015

(54) METHOD AND APPARATUS FOR VISUALIZING RECORD DATA

(71) Applicant: Electronics and Telecommunications Research Institute, Daejeon (KR)

(72) Inventors: Keonwoo Kim, Daejeon (KR); Sung Kyong Un, Daejeon (KR); Youn-Hee Gil, Daejeon (KR); Youngsoo Kim, Daejeon (KR); Sang Su Lee, Daejeon (KR); Jooyoung Lee, Daejeon (KR); Su Hyung Jo, Daejeon (KR); Woo Yong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/094,897

(22) Filed: Dec. 3, 2013

(65) Prior Publication Data

US 2014/0295787 A1 Oct. 2, 2014

(30) Foreign Application Priority Data

Mar. 27, 2013 (KR) .......................... 10-2013-0032521

(51) Int. Cl.
*H04M 11/00* (2006.01)
*H04M 15/06* (2006.01)
*G06F 3/14* (2006.01)
*G06Q 10/00* (2012.01)
*G06Q 50/26* (2012.01)
*H04M 15/00* (2006.01)

(52) U.S. Cl.
CPC ............... *H04M 15/06* (2013.01); *G06F 3/14* (2013.01); *G06Q 10/00* (2013.01); *G06Q 50/26* (2013.01); *H04M 15/58* (2013.01)

(58) Field of Classification Search
CPC .......... G06F 3/14; H04M 15/06; H04M 15/58
USPC ......... 455/418, 412.2, 566, 405; 707/751, 748
See application file for complete search history.

(56) References Cited

U.S. PATENT DOCUMENTS

| 7,506,026 B1 * | 3/2009 | Lance et al. .................. 709/203 |
| 7,640,223 B2 | 12/2009 | Birdwell et al. |
| 2009/0013281 A1 | 1/2009 | Helfman et al. |

(Continued)

FOREIGN PATENT DOCUMENTS

KR 10-2012-0086926 8/2012

OTHER PUBLICATIONS

MacMillan et al., "Zuckerburg's Social Graph", www.businessweek.com/articles/2012-05-18/zuckerbergs-social-graph.*

(Continued)

*Primary Examiner* — David Q Nguyen
(74) *Attorney, Agent, or Firm* — NSIP Law

(57) ABSTRACT

A method for visualizing record data with a mobile forensic device for collecting and managing the record data including partner information when an event, such as a call or text service, occurs, includes: calculating an event occurrence frequency for each partner information using the collected record data; and classifying the partner information on the basis of a grade according to the calculated event occurrence frequency. Further, the method includes generating graphic data showing a relation between the partner information and user information of a mobile terminal on the basis of the classified grade; and displaying the graphic data.

18 Claims, 4 Drawing Sheets

(56) References Cited

U.S. PATENT DOCUMENTS

| | | | |
|---|---|---|---|
| 2010/0062753 A1* | 3/2010 | Wen et al. | 455/418 |
| 2011/0213785 A1* | 9/2011 | Kristiansson et al. | 707/748 |
| 2011/0231396 A1* | 9/2011 | Dhara et al. | 707/731 |
| 2012/0060089 A1* | 3/2012 | Heo et al. | 715/702 |
| 2012/0158751 A1* | 6/2012 | Tseng | 707/751 |

OTHER PUBLICATIONS

Jens Olsson et al., "Computer forensic timeline visualization tool," Digital Investigation, vol. 6, pp. S78-S87, Sep. 2009.

Marrington, Andrew D. et al., "Event-based Computer Profiling for the Forensic Reconstruction of Computer Activity," Proceedings AusCERT Asia Paific Information Technology Security Conference (AusCERT2007): Refereed R&D Stream, pp. 71-87, 2007.

\* cited by examiner

METHOD AND APPARATUS FOR VISUALIZING RECORD DATA

CROSS-REFERENCE TO RELATED APPLICATION(S)

The present invention claims priority of Korean Patent Application No. 10-2013-0032521, filed on Mar. 27, 2013, which is incorporated herein by reference.

FIELD OF THE INVENTION

The present invention relates to visualization of record data in a mobile terminal, and more particularly, to a method and apparatus for visualizing record data, which analyze record data collected by a forensic device to effectively show a relationship between a user and his/her call partner.

BACKGROUND OF THE INVENTION

A mobile forensic tool functions to collect and analyze data, such as call record, SMS use record, map use record, SNS use record, etc., from a mobile device including a smartphone.

In general, the mobile forensic tool has focused on data collection and analysis and thus does not provide a method of meaningfully representing data. That is, the 32521mobile forensic tool just arranges call record data and SMS use record data in the occurrence order to display the data to a user in a text form. The displayed data includes a call/SMS use time, a call partner's number, SMS content, etc.

However, recently users may desire a specialized service such as finding a call person with whom a user has made a phone call most frequently and separately viewing a call record and an SNS history. In this case, a conventional mobile forensic tool cannot efficiently present the service to the user.

Accordingly, in order to deliver information to a user more efficiently, forensic data needs to be shaped to have a meaning as information, using a data visualization technique.

Also, when simultaneously representing calling/SMS record data of two persons, a typical method simply arranges and then each record data on a screen. In particular, in order to find out a telephone number commonly used by two persons, a user has a difficulty in that the user should directly search data in a form of each text and find out the common information.

U.S. Patent Publication No. 2009/0013281 discloses a technology of a data visualization method for representing multiple data in a hierarchy structure data set.

SUMMARY OF THE INVENTION

In view of the above, the present invention provides an apparatus and method for checking the frequency of use in a call or SMS service on the basis of occurrence of an event such as the calling or SMS service in a mobile device and then providing a relation between user information and partner information that is a target for event occurrence in a graphic form.

Further, the present invention provides an apparatus and method for receiving graphic data about any user from the outside, comparing the received graphic data with graphic data stored in the mobile device, and displaying common items between the any user and the user of the mobile device in a graphic form.

In accordance with a first aspect of the present invention, there is provided a method for visualizing record data with a mobile forensic device for collecting and managing the record data including partner information when an event, such as a call or text service, occurs. The method includes: calculating an event occurrence frequency for each partner information using the collected record data; classifying the partner information on the basis of a grade according to the calculated event occurrence frequency; generating graphic data showing a relation between the partner information and user information of a mobile terminal on the basis of the classified grade; and displaying the graphic data.

Further, the calculating may comprise calculating the event occurrence frequency for each partner information on the basis of a different weight given depending on a type of the event.

Further, the calculating may comprise calculating the event occurrence frequency for each partner information on the basis of the number of event occurrences in the partner information.

Further, the generating of the graphic data may comprise placing partner information with the same grade on the same line.

Further, the generating of the graphic data may comprise placing the user information on a center, placing partner information having a highest grade among the classified grades on a circle close to the center, and placing partner information having a second highest grade on a circle surrounding the circle to place the partner information according to the grade.

Further, the method may further comprise, when one or more pieces of partner information or the user information is selected in the displayed graphic data, providing relevant information of the selected information.

Further, the relevant information may comprise an event occurrence time, an event type, incoming/outgoing call separation data, or text content related to text event occurrence.

Further, the method may further comprise, when specific partner information is selected in the displayed graphic data, requesting graphic data for the selected partner information from the outside and receiving the requested graphic data; analyzing association between the received graphic data and the displayed graphic data to extract common relation information between the partner and the user; and generating and displaying an extended graphic data including the common relation information.

Further, the extended graphic data may have a structure where the received graphic data, the displayed graphic data, and the common relation information are connected to each other.

Further, a connection line may be set to have a different thickness or color according to the grade of the common partner information in the received graphic data and the displayed graphic data.

In accordance with a second aspect of the present invention, there is provided an apparatus for visualizing record data with a mobile forensic device for collecting and managing the record data including partner information when an event, such as a call or text service, occurs. The apparatus includes: a calculation unit configured to calculate an event occurrence frequency for each partner information using the collected record data; a classification unit configured to classify the partner information on the basis of a grade according to the calculated event occurrence frequency; and a visualization interface unit configured to generate graphic data showing a relation between the partner information and user information of a mobile terminal on the basis of the classified grade.

Further, the calculation unit may be configured to calculate the event occurrence frequency for each partner information on the basis of the number of event occurrences in the partner information and a different weight given depending on a type of the event.

Further, the calculation unit may be configured to calculate the event occurrence frequency for each partner information on the basis of the number of event occurrences in the partner information.

Further, the calculation unit may be configured to calculate the event occurrence frequency for each partner information on the basis of the number of event occurrences in the part information.

Further, the visualization interface unit may be configured to generate the graphic data by placing partner information with the same grade on the same line.

Further, the visualization interface unit may place the partner information according to the grade by placing the user information on a center, placing partner information having a highest grade among the classified grades on a circle close to the center, and placing partner information having a second highest grade on a circle surrounding the circle.

Further, the visualization interface unit may be configured to provide relevant information of the selected partner or user information when the placed partner information or user information is selected.

Further, the relevant information may comprise an event occurrence time, an event type, incoming/outgoing call separation data, or text content related to text event occurrence.

Further, the apparatus may further comprise a common relation extraction unit configured to analyze graphic data of the mobile users and graphic data for partner information received from the outside to extract common relation information between the partner and the user, and the visual interface unit may generate an extended graphic data including the common relation information.

Further, the extended graphic data may have a structure where the graphic data of the partner and the graphic data of the user and the partner information corresponding to the common relation information are connected.

Further, in the extended graphic data, a connection line may be set to have a different thickness or color according to the grade of the partner information corresponding to the common relation information in the graphic data of the partner information and the graphic data of the user.

In accordance with the present invention, it is possible to visually and easily find who the user has called and messaged most frequently, from a variety of record data collected by the mobile terminal, for example, calling record and SMS service use record.

It is also possible to infer association between two persons by extracting and visualizing common relation information between the two persons on the basis of record data about the two persons.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In the following description, when the detailed description of the relevant known function or configuration is determined to unnecessarily obscure the important point of the present invention, the detailed description will be omitted. Further, terms used herein are terms that have been defined in consideration of functions in embodiments, and the terms that have been defined as described above may be altered according to the intent of a user or operator, or conventional practice, and thus, the terms need to be defined on the basis of the entire content of this specification.

Hereinafter, embodiments of the present invention will be described in detail with reference to the accompanying drawings.

Figure 1:
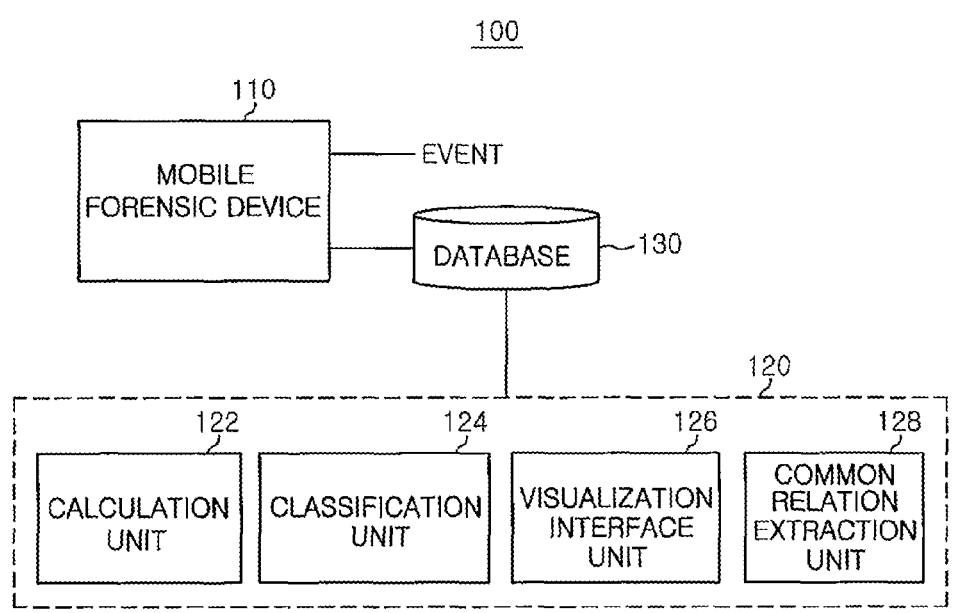
FIG. 1 is a block diagram showing an internal configuration of a mobile terminal including a data visualization device in accordance with an embodiment of the present invention.

FIG. 1 is a block diagram showing an internal configuration of a mobile terminal including a data visualization device according to an embodiment of the present invention, and the mobile terminal may include a mobile forensic device 110 and the record data visualization device 120.

The record data according to an embodiment of the present invention may mean data collected and generated by the mobile terminal 100 where an event, such as call, SMS, MMS transmission, or SMS service using a messenger app, for example, KaKao Talk, occurs. That is, the record data may include call duration, a partner phone number, SMS type, SMS time, SMS content, incoming/outgoing call separation data, etc.

Since each record data has a recipient, there may be multiple record data for each recipient. That is, there may be multiple record data for a specific recipient over several time periods.

The record data may be collected and managed by the mobile forensic device 110. That is, the mobile forensic device 110 may store the record data when an event such as a call or text messaging service occurs in the mobile terminal 100. Specifically, the mobile terminal 100 may extract and then store a call time to a recipient, text messaging service type, content, incoming/outgoing call separation data, etc. to the database 130.

The record data visualization device 120 may classify the record data stored in the database 130 on the basis of recipient information, count the number of event occurrences for each recipient information, map the number of event occurrences to the recipient information, and set a grade for each recipient information on the basis of the mapped number of event occurrences. For example, an event occurrence frequency for each recipient may be calculated on the basis of the total number of event occurrences, and a grade may be set according to the calculated event occurrence frequency.

Also, the record data visualization device 120 may place each recipient information on the basis of user information of the mobile terminal 100 to display the recipient information. That is, the record data visualization device 120 may place recipient information corresponding to the highest grade in a central region and place recipient information corresponding to the second highest grade in a region outside the central region.

Figure 2:
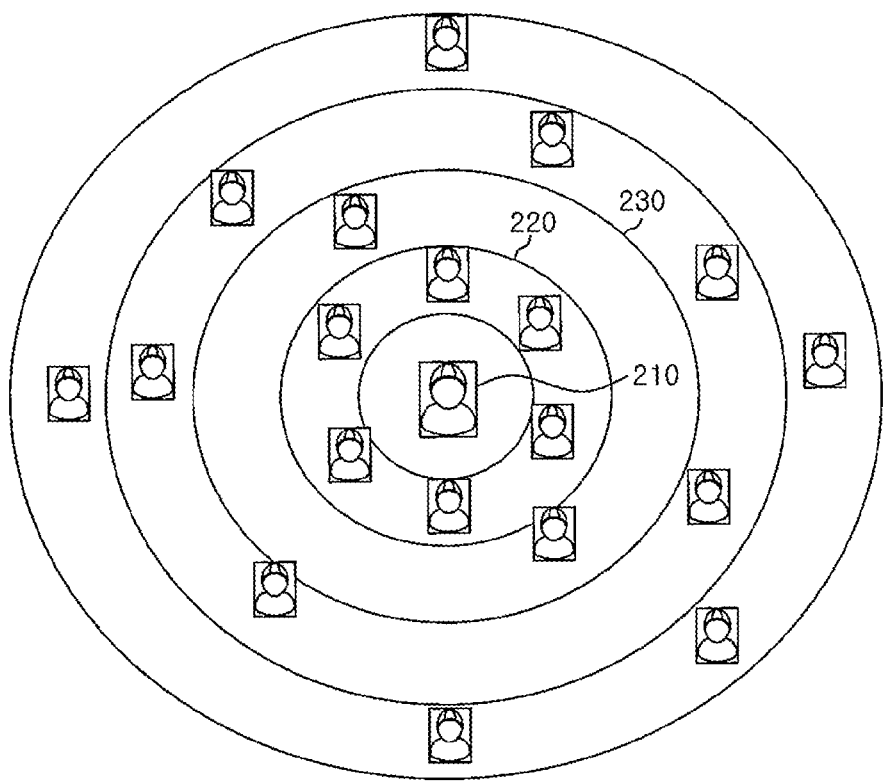
FIG. 2 is an exemplary diagram showing graphic data generated by an apparatus in accordance with an embodiment of the present invention.

For example, as shown in FIG. 2, the record data visualization device 120 may place user information, such as a user name, in a first circle 210, place recipient information having a highest event occurrence frequency (a first grade) in a second circle 220 adjacent to the first circle 210, and place recipient information having a second highest event occurrence frequency (a second grade) in a third circle 230 adjacent to the second circle to visualize the record data. Here, the first grade may denote recipient information where the event occurrence frequency is equal to or greater than 80%, and the second grade may denote recipient information where the event occurrence frequency is 50 to 80%. However, the present invention is not limited thereto.

Also, the record data visualization device 120 may display, in an icon form, recipient information placed on the basis of users and display detail information about the recipient information when each icon is selected. Here, the detail information may include, but are not limited to, a phone number, an ID, and an event occurrence number of a recipient.

The record data visualization device 120 may include a calculation unit 122, a classification unit 124, a visualization interface unit 126, and a common relation extraction unit 128.

The calculation unit 122 may calculate an event occurrence frequency for each partner information, using record data collected by the mobile forensic device 110. That is, the calculation unit 120 may calculate the event occurrence frequency on the basis of the number, type, and so on, of events generated for each partner by the user of the mobile terminal 100. Specifically, the calculation unit 120 may give different weights depending on the event type, reflect the event number, and calculate the event occurrence frequency for the partner information. For example, the calculation unit 120 may gives a weight of 0.5 to an event such as SMS message, SNS message, etc., and a weight of 0.8 to a video and audio event such as phone conversation, and then calculates the event occurrence frequency for the partner information.

The classification unit 124 may set a grade for each partner information on the basis of the event occurrence frequency. For example, the classification unit 124 may set partner information having the event occurrence frequency of 50 to 80% to a first grade and to partner information having the event occurrence frequency of about 40% to a second grade. The grade information set for the partner information may be provided to the visualization interface unit 126.

The visualization interface unit 126 may generate graphic data by placing partner information having a high grade on the basis of the user information and then display the graphic data on the display device. For example, visualization interface unit 126 may generate graphic data as shown in FIG. 2, and then display the graphic data on the display device.

Furthermore, the visualization interface unit 126 may display a variety of relevant information mapped to partner information and user information of the graphic data. That is, the visualization interface unit 126 may map relevant information such as a phone number, email address, event occurrence time, event type, incoming/outgoing call separation, text content about a text event, etc. to the partner information and user information and then store the relevant information, and when the user information or partner information is selected, may select the relevant information mapped to the selected partner or user information through a separate window.

When one or more of the partner information displayed by the visualization interface unit 126 and the record data collected by the mobile forensic device 110 are selected, the common relation extraction unit 128 may request the record data about the selected user from the terminal (not shown) of the selected user or an external server (not shown).

Also, the common relation extraction unit 128 may receive data from the terminal of the selected user or the external server, compare the received record data with the collected record data to extract common item information between the user of the mobile terminal 100 and the selected user, and then provide the extracted common item information to the visualization interface unit 126. Here, the data received from the terminal of the selected user or the external server may be graphic record data generated by the terminal of the selected user.

Figure 3:
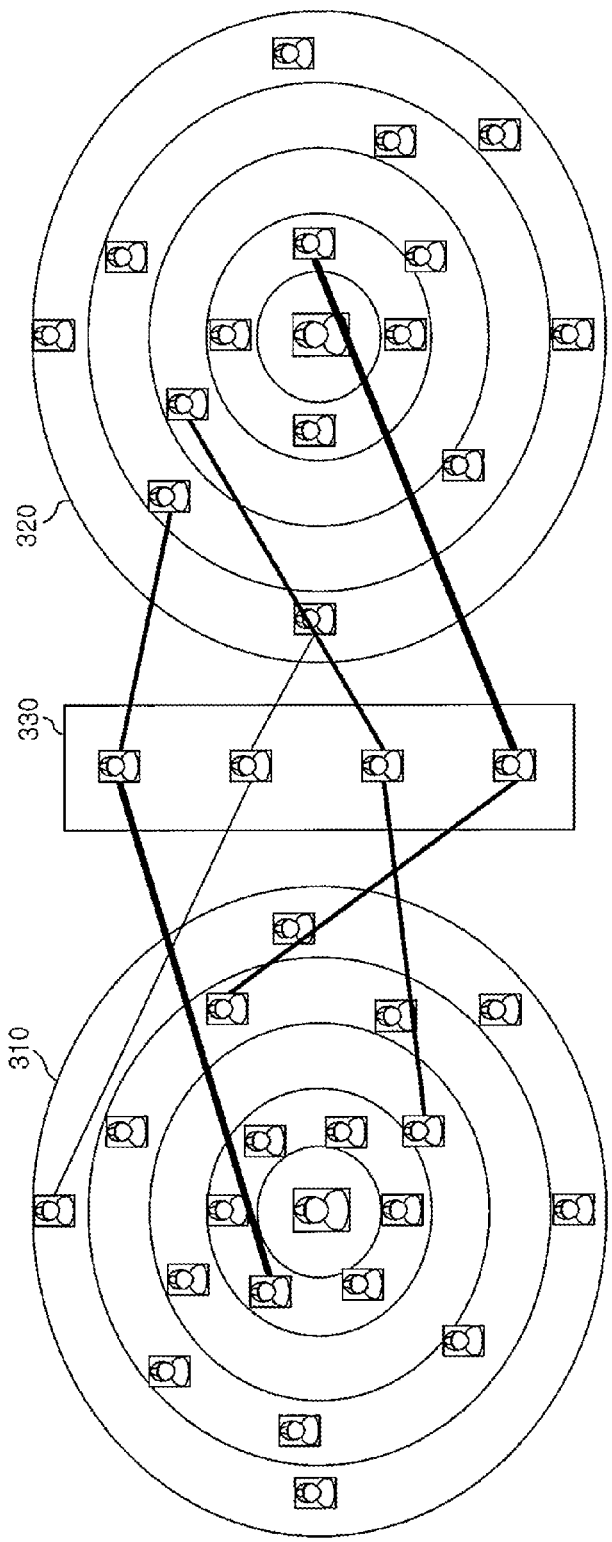
FIG. 3 is an exemplary diagram showing a relationship between two users generated by the apparatus in accordance with an embodiment of the present invention.

The visualization interface unit 126 may generate the graphic data using the common item and the data for the selected user. That is, as shown in FIG. 3, the visualization interface unit 126 may display graphic data 310 for the user of the mobile terminal 100, graphic data 320 for the selected user, and common item information 330 together. In this case, lines connected between information items of the common item information 330 and partner information in the graphic data 310 for the user of the mobile terminal 100 and the graphic data 320 for the selected user may have different thicknesses or colors depending on the event occurrence frequency. That is, as the event occurrence frequency is high, the line may have a great thickness or different color.

In the mobile terminal 100 as described above, a process of visualizing and displaying record data will be described with reference to FIG. 4.

Figure 4:
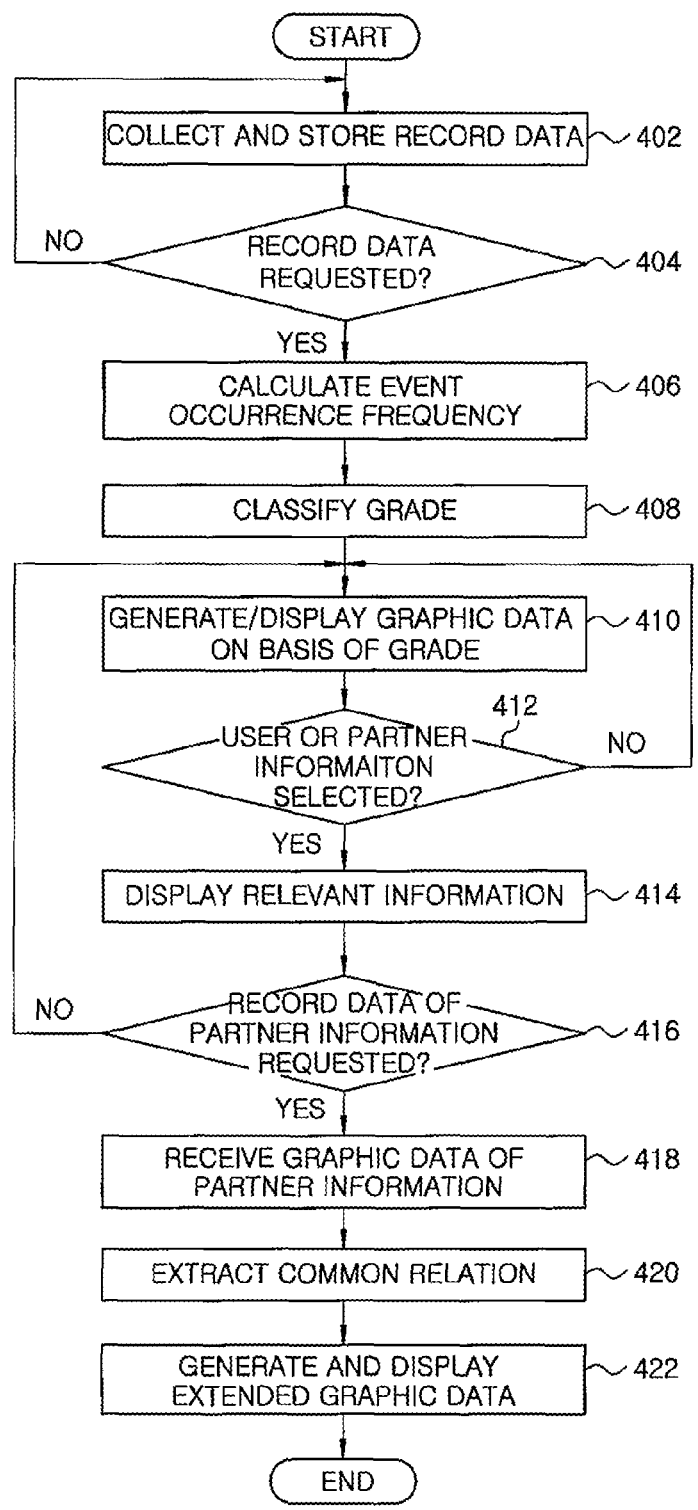
FIG. 4 is a flow chart showing a process of visualizing record data collected by a mobile forensic device in accordance with an embodiment of the present invention.

FIG. 4 is a flow chart showing a process of visualizing record data according to an embodiment of the present invention.

Referring to FIG. 4, first, the mobile forensic device 100 collects record data based on an event when the event, such as calling or text messaging service, occurs, and stores the collected record data in the database 130 in operation 402. Here, the record data may include partner information of event occurrence, a type of an application used in a text messaging service, phone conversation type, call duration, message content, etc.

When receiving the record data request in operation 404 while collecting and storing record data in operation 402, the calculation unit 122 of the record data visualization device 120 extracts the record data from the database 130 and then analyzes the extracted record data to calculate an event occurrence frequency for each partner information in operation 406. To calculate the event occurrence frequency for the partner information, the calculation unit 120 may check the number of event occurrences or may give a different weight depending on the event type. The calculated event occurrence frequency is provided to the classification unit 124.

The classification unit 124 may give a grade to each partner information on the basis of the event occurrence frequency in operation 408. That is, the classification unit 124 may give the grade to each partner information by giving a first grade to the partner information occupying a predetermined range, for example, 80% or greater and a second grade to the partner information occupying 50 to 80%. Here, the grade may mean a relation between the user of the mobile terminal 100 and partner information.

Next, the visualization interface unit 126 may generate graphic data (FIG. 2) showing the relation between the partner information and the user of the mobile terminal 100 on the basis of the classified grade and then display the generated graphic data on a display device (not shown) in operation 410.

Subsequently, when a user selects user information or partner information among the graphic data in operation 412, the visualization interface unit 126 displays a variety of information such as relevant information of the selected user or partner information, for example, a user name, a partner name, a text content, and an event occurrence time to the display device in operation 414.

As described above, when record data for specific partner information is requested in operation 416 while the graphic data is displayed, the visualization interface unit 126 requests the record data for specific partner information from a terminal or external server (not shown) corresponding to the specific partner information and then receives graphic data of the specific partner information as a response to the request in operation 418. The graphic data received in operation 418 is provided to the visualization interface unit 126.

Next, the common relation extraction unit 128 compares the received graphic data with the graphic data of the user to extract the common relation information in operation 420. That is, the common relation extraction unit 128 may extract the common relation information by comparing the partner information in the user graphic data with the partner information in the received graphic data to select common partner information.

The visualization interface unit 126 may generate extended graphic data using the common relation information, the user graphic data, and the received graphic data (partner graphic data), and display the extended graphic data on a display device (not shown) in operation 422. That is, as shown in FIG. 3, the extended graphic data may be generated by placing the common partner information of the user graphic data and the partner graphic data in a central position, placing the user graphic data and the partner graphic data, and connecting the user graphic data and the partner graphic data with the common partner information. The connection lines between the common partner information and the user and partner graphic data may be set to have different color or thickness depending on the event occurrence frequency.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for visualizing record data with a mobile forensic device for collecting and managing the record data including partner information when an event occurs, the method comprising:
   calculating an event occurrence frequency for each partner information using the collected record data;
   classifying the partner information on the basis of a grade according to the calculated event occurrence frequency;
   generating graphic data showing a relation between the partner information and user information of a mobile terminal on the basis of the classified grade;
   displaying the graphic data; and
   in response to specific partner information being selected in the displayed graphic data, requesting graphic data for the selected partner information from the outside and receiving the requested graphic data;
   analyzing associations between the received graphic data and the displayed graphic data to extract common relation information between the partner and the user; and
   generating and displaying an extended graphic data including the common relation information.

2. The method of claim 1, wherein the calculating comprises calculating the event occurrence frequency for each partner information on the basis of a different weight given depending on a type of the event.

3. The method of claim 1, wherein the calculating comprises calculating the event occurrence frequency for each partner information on the basis of the number of event occurrences in the partner information.

4. The method of claim 1, wherein the generating of the graphic data comprises placing partner information with the same grade on the same line.

5. The method of claim 1, wherein the generating of the graphic data comprises placing the user information on a center, placing partner information having a highest grade among the classified grades on a circle close to the center, and placing partner information having a second highest grade on a circle surrounding the circle to place the partner information according to the grade.

6. The method of claim 1, further comprising, when one or more pieces of partner information or the user information is selected in the displayed graphic data, providing relevant information of the selected information.

7. The method of claim 6, wherein the relevant information comprises an event occurrence time, an event type, incoming/outgoing call separation data, or text content related to text event occurrence.

8. The method of claim 1, wherein the extended graphic data has a structure where the received graphic data, the displayed graphic data, and the common relation information are connected to each other.

9. The method of claim 1, wherein a connection line is set to have a different thickness or color according to the grade of the common partner information in the received graphic data and the displayed graphic data.

10. An apparatus for visualizing record data with a mobile forensic device for collecting and managing the record data including partner information when an event occurs, the apparatus comprising:
    a calculator configured to calculate an event occurrence frequency for each partner information using the collected record data;
    a classifier configured to classify the partner information on the basis of a grade according to the calculated event occurrence frequency;
    a visualization interface configured to generate graphic data showing a relation between the partner information and user information of a mobile terminal on the basis of the classified grade; and
    a common relation extractor configured to, in response to specific partner information being selected in the generated graphic data, request graphic data for the selected partner information from the outside and receive the requested graphic data and analyze graphic data of the mobile users and graphic data for partner information received from the outside to extract common relation information between the partner and the user,
    wherein the visual interface unit generates an extended graphic data including the common relation information.

11. The apparatus of claim 10, wherein the calculation unit is configured to calculate the event occurrence frequency for each partner information on the basis of the number of event occurrences in the partner information and a different weight given depending on a type of the event.

12. The apparatus of claim 10, wherein the calculation unit is configured to calculate the event occurrence frequency for each partner information on the basis of the number of event occurrences in the partner information.

13. The apparatus of claim 10, wherein the visualization interface unit is configured to generate the graphic data by placing partner information with the same grade on the same line.

14. The apparatus of claim 10, wherein the visualization interface unit places the partner information according to the grade by placing the user information on a center, placing partner information having a highest grade among the classified grades on a circle close to the center, and placing partner information having a second highest grade on a circle surrounding the circle.

15. The apparatus of claim 10, wherein the visualization interface unit is configured to provide relevant information of the selected partner or user information when the placed partner information or user information is selected.

16. The apparatus of claim 15, wherein the relevant information comprises an event occurrence time, an event type, incoming/outgoing call separation data, or text content related to text event occurrence.

17. The apparatus of claim 10, wherein the extended graphic data has a structure where the graphic data of the partner and the graphic data of the user and the partner information corresponding to the common relation information are connected.

18. The apparatus of claim 10, wherein in the extended graphic data, a connection line is set to have a different thickness or color according to the grade of the partner information corresponding to the common relation information in the graphic data of the partner information and the graphic data of the user.

* * * * *